United States Patent
Okubo (10) Patent No.: US 6,943,835 B2
(45) Date of Patent: Sep. 13, 2005

(54) IMAGE PROCESSING METHOD AND APPARATUS AND COMPUTER-READABLE STORAGE MEDIUM HAVING AN ELECTRONIC ZOOM FUNCTION

(75) Inventor: Toshiyuki Okubo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 691 days.

(21) Appl. No.: 09/947,146

(22) Filed: Sep. 5, 2001

(65) Prior Publication Data

US 2002/0028076 A1 Mar. 7, 2002

(30) Foreign Application Priority Data

Sep. 5, 2000 (JP) ........................................ 2000-268972

(51) Int. Cl.$^7$ ............................................. H04N 5/262
(52) U.S. Cl. ................................ 348/240.2; 348/208.12
(58) Field of Search ........................ 348/240.2, 240.99, 348/240.1, 240.3, 208.4, 208.5, 208.6, 208.12

(56) References Cited

U.S. PATENT DOCUMENTS 5,845,011 A * 12/1998 Miyamoto et al. .......... 382/232
6,798,447 B1 * 9/2004 Katsuki ................. 348/208.12

* cited by examiner

Primary Examiner—Tuan Ho
Assistant Examiner—Heather R. Long
(74) Attorney, Agent, or Firm—Morgan & Finnegan, L.L.P.

(57) ABSTRACT

An image pickup apparatus is disclosed to prevent recording of a degraded image by restricting setting of an electronic zoom function when a recording mode is set to a low-compression ratio mode or non-compression mode. The image pickup apparatus comprises a processing device for electronically enlarging an image picked up by an image pickup unit, a setting device for setting compressing operation for the image picked up by the image pickup unit, and a control device to restrict operation of the processing device in accordance with the compressing operation for the image which is set by the setting device. When a compression ratio equal to or less than a predetermined value is set by the recording mode setting unit or the non-compression mode is set, a system control circuit inhibits the electronic zoom function that tends to cause a deterioration in image quality from being turned on.

9 Claims, 7 Drawing Sheets

FIG. 7

IMAGE PROCESSING METHOD AND APPARATUS AND COMPUTER-READABLE STORAGE MEDIUM HAVING AN ELECTRONIC ZOOM FUNCTION

FIELD OF THE INVENTION

The present invention relates to an image processing method and apparatus for recording a photographed still image or moving image on a recording medium and a computer-readable storage medium and, more particularly, to an apparatus having an electronic zoom function.

BACKGROUND OF THE INVENTION

Image processing apparatuses such as electronic cameras for recording/reproducing still images and moving images on/from memory cards having solid memory elements as recording media have already been available on the market. Some apparatuses have an electronic zoom function and recording mode setting function.

According to these image processing apparatuses such as electronic cameras, photographing can be done at a field angle larger than the focal length of a mounted optical lens, the compression ratio of a photographed image can be set to a predetermined value, and a photographed image can be recorded without compression.

In the electronic zoom function, however, since a portion of a photographed image is extracted and enlarged and the resultant image is recorded, the image quality tends to deteriorate. If, therefore, the recording mode is set to a low-compression-ratio mode or non-compression mode to prevent a deterioration in image quality, and the electronic zoom function is executed, a degraded image is recorded against the original intention of preventing a deterioration in image quality.

SUMMARY OF THE INVENTION

The present invention has been made in consideration of the above problem, and has as its object to prevent recording of a degraded image by restricting setting of an electronic zoom function when a recording mode designed to prevent a deterioration in image quality is set to a low-compression ratio mode or non-compression mode.

In order to solve the above problem and achieve the above object, an image processing apparatus according to the present invention is characterized by having the following arrangement.

There is provided an image pickup apparatus comprising a processing device for electronically enlarging an image picked up by image pickup means, a setting device for setting compressing operation for the image picked up by the image pickup means, and a control device for determining whether to restrict operation of the processing device in accordance with the compressing operation for the image which is set by the setting device.

An image processing method according to the present invention is characterized as follows.

There is provided an image processing method of processing an image picked up by image pickup means, comprising determining whether to restrict processing operation of electronically enlarging an image picked up by the image pickup means in accordance with a compressing operation setting for the image picked up by the image pickup means.

A program according to the present invention is characterized by being a program for causing a computer to function as each of the means described above.

A storage medium according to the present invention is characteristic by storing the above program.

As described above, according to the present invention, when a recording mode designed to prevent a deterioration in image quality is set to a low-compression ratio mode or non-compression mode, setting of the electronic zoom function is restricted. For example, a restriction is made to inhibit the electronic zoom function from being turned on.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

An image processing method and apparatus and computer-readable storage medium according to the present invention will be described below with reference to the accompanying drawings.

Figure 1:
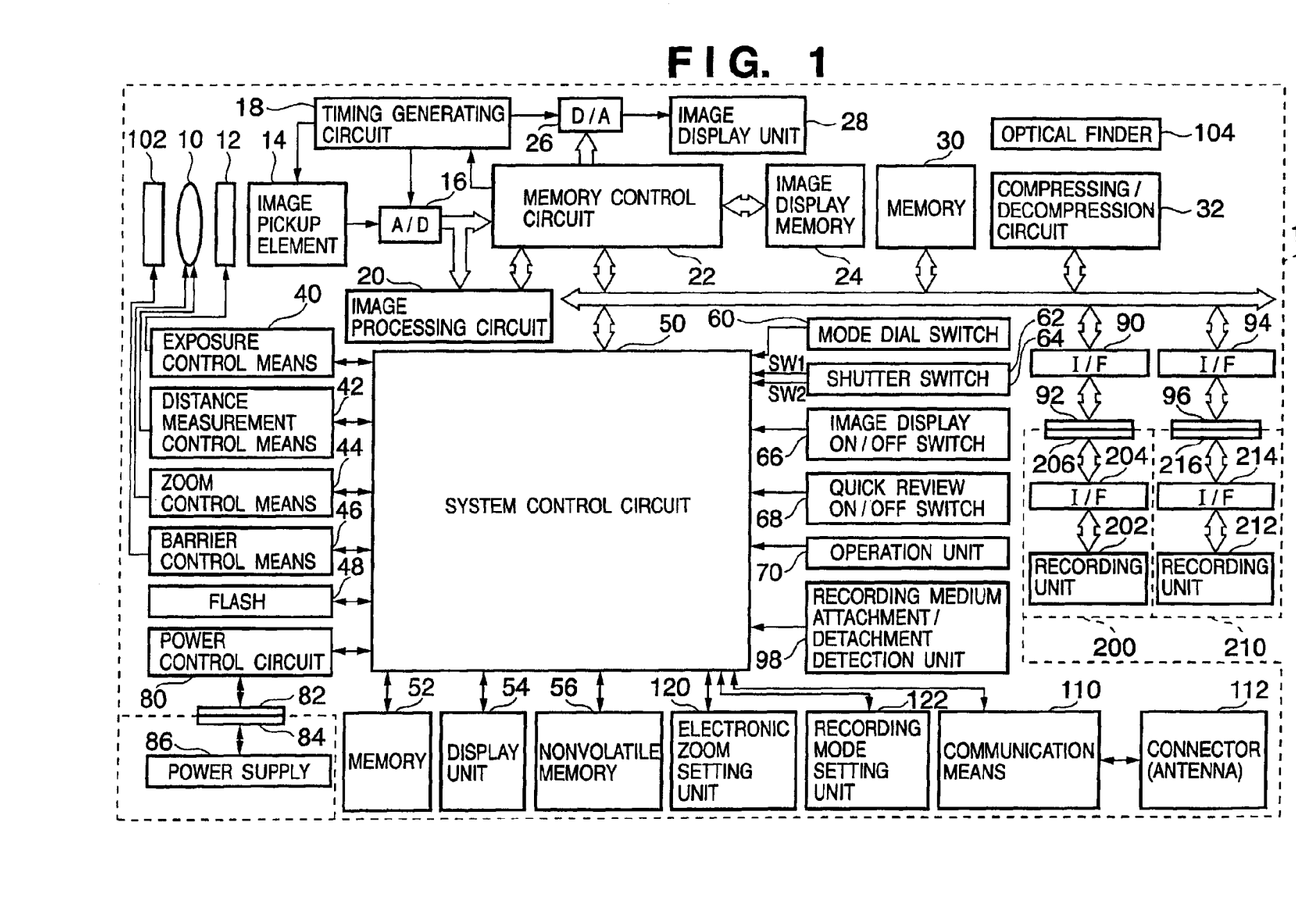
FIG. 1 is a block diagram showing the arrangement of an image processing apparatus according to an embodiment.

FIG. 1 is a block diagram showing the arrangement of an image processing apparatus 100 according to this embodiment. Referring to FIG. 1, reference numeral 10 denotes a phototaking lens; 12, a shutter having a stop function; 14, an image pickup element for converting an optical image into an electrical signal; 16, an A/D converter for converting the analog signal output from the image pickup element 14 into a digital signal; and 18, a timing generating circuit for supplying clock and control signals to the image pickup element 14, the A/D converter 16, and a D/A converter 26. The timing generating circuit 18 is controlled by a memory control circuit 22 and system control circuit 50.

Reference numeral 20 denotes an image processing circuit for performing predetermined image interpolation processing and color conversion processing for data from the A/D converter 16 or from memory control circuit 22. The image processing circuit 20 performs predetermined computation processing by using picked image data. The system control circuit 50 then controls an exposure control means 40 and distance measurement control means 42 on the basis of the obtained computation result to perform TTL (Through The Lens) AF (AutoFocus) processing, AE (Automatic Exposure) processing, and EF (Electronic Flash pre-emission) processing. The image processing circuit 20 also performs predetermined computation processing by using the picked image data, and performs TTL AWB (Automatic White Balance) processing on the basis of the obtained computation result.

The memory control circuit 22 controls the A/D converter 16, the timing generating circuit 18, the image processing circuit 20, an image display memory 24, the D/A converter 26, a memory 30, and a compression/decompression circuit 32. Data from the A/D converter 16 is written in the image display memory 24 or the memory 30 through the image processing circuit 20 and memory control circuit 22 or directly through the memory control circuit 22.

Reference numeral 24 denotes the image display memory; 26, the D/A converter; and 28, an image display unit constituted by a TFT LCD and the like. The display image data written in the image display memory 24 is displayed on the image display unit 28 through the D/A converter 26. If picked image data are sequentially displayed on the image display unit 28, an electronic finder function can be implemented. In addition, the image display unit 28 can arbitrarily turn on/off display in accordance with an instruction from the system control circuit 50. When display is turned off, the power consumption of the image processing apparatus 100 can be greatly reduced.

The memory 30 stores photographed still images and moving images. The memory 30 has a storage capacity large enough to store a predetermined number of still images or moving images of a predetermined duration. This makes it possible to write a large amount of image data in the memory 30 at high speed in the continuous photographing mode of continuously photographing a plurality of still images or in the panoramic photographing mode. The memory 30 can also be used as a work area for the system control circuit 50.

The compression/decompression circuit 32 compresses/decompresses image data by adaptive discrete cosine transform (ADCT) or the like. The compression/decompression circuit 32 loads image data stored in the memory 30 to compress or decompress it, and writes the resultant data in the memory 30.

The exposure control means 40 controls the shutter 12 having the stop function, and has a flash brightness control function in cooperation with a flash 48. The distance measurement control means 42 controls focusing of the phototaking lens 10. Reference numeral 44 denotes a zoom control means for controlling zooming of the phototaking lens 10; and 46, a barrier control means for controlling the operation of a protective means 102 which is a barrier. The flash 48 also has an AF auxiliary light emitting function and flash brightness control function. The exposure control means 40 and distance measurement control means 42 are controlled by the TTL scheme; the system control circuit 50 controls the exposure control means 40 and distance measurement control means 42 on the basis of the computation result obtained by the image processing circuit 20 on picked image data.

The system control circuit 50 controls the overall image processing apparatus 100. In this embodiment, the system control circuit 50 implements the function of the control means according to the present invention. Reference numeral 52 denotes a memory in which constants, variables, programs, and the like used for the operation of the system control circuit 50 are stored.

Reference numeral 54 denotes a display unit such as a liquid crystal display apparatus or speaker, which presents an operation state, message, and the like by using characters, images, sounds, and the like in accordance with the execution of a program by the system control circuit 50. The display unit 54 is mounted at one or a plurality of positions near the operation unit of the image processing apparatus 100, at which the user can visually recognize with ease, and is comprised of a combination of an LCD or LED, a sound generating element, and the like. The function of the display unit 54 is partly set in an optical finder 104.

Of the contents displayed on the display unit 54, information to be displayed on the LCD or the like includes a single shot/continuous photographing indication, self-timer indication, compression ratio indication, recording pixel number indication, recording image number indication, remaining frame count indication, shutter speed indication, aperture value indication, exposure correction indication, flash indication, red-eye reduction indication, macro photography indication, buzzer setting indication, timepiece battery remaining capacity indication, battery remaining capacity indication, error indication, information indication using a number of a plurality of digits, attachment/detachment indication of recording media 200 and 210, communication I/F operation indication, date/time indication, and the like.

Of the contents displayed on the display unit 54, the information to be displayed in the optical finder 104 includes an in-focus indication, camera shake warning indication, flash recharge indication, shutter speed indication, aperture value indication, exposure correction indication, and the like.

Reference numeral 56 denotes a nonvolatile memory capable of electrically erasing/recording data. For example, an EEPROM or the like is used as this memory. Reference numerals 60, 62, 64, 66, 68, and 70 denote operation means for inputting various operation instructions for the system control circuit 50, each of which is formed by one or a combination of a plurality of a switch, dial, touch panel, pointing device based on line-of-sight detection, speech recognition apparatus, and the like.

More specifically, the mode dial switch 60 allows switching/setting of various function modes, e.g., a power OFF mode, automatic photographing mode, photographing mode (full automatic mode or manual mode), panoramic photographing mode, replay mode, multi-frame replay/erase mode, and PC connection mode.

Reference numeral 62 denotes a shutter switch SW1 which is turned on in the process of operating a shutter button (not shown) to give an instruction to start operation, e.g., AF (AutoFocus) processing, AE (Automatic Exposure) processing, AWE (Automatic White Balance) processing, or EF (Electronic Flash pre-emission) processing; and 64, a shutter switch SW2 which is turned on upon completion of the operation of the shutter button (not shown) to generate an instruction to start a series of operations including exposure processing of writing the signal read from the shutter 12 as image data in the memory 30 through the A/D converter 16 and memory control circuit 22, developing using the computation results obtained by the image processing circuit 20 and memory control circuit 22, and recording processing in which image data is read out from the memory 30 and compressed by the compression/decompression circuit 32, and the compressed image data is written in the recording medium 200 or 210.

The image display ON/OFF switch 66 allows ON/OFF setting of the image display unit 28. With this function, power savings can be done by stopping the supply of a current to the image display unit comprised of a TFT LCD and the like when photographing is performed by using the optical finder 104.

The quick review ON/OFF switch 68 is used to set the quick review function of automatically reproducing photographed image data immediately after photographing.

The operation unit 70 is comprised of various buttons, a touch panel, and the like. The buttons include a menu button, set button, macro button, multi-frame reproduction new page button, flash setting button, single-shooting/continuous shooting/self-timer switching button, menu movement + (plus) button, menu movement − (minus) button, reproduction image movement + (plus) button, reproduction image − (minus) button, photographed image quality selection button, exposure correction button, date/time setting button, and the like.

Reference numeral 80 denotes a power control circuit comprised of a battery detection circuit, a DC/DC converter, a switch circuit for switching blocks to be energized, and the like. The power control circuit 80 detects the presence/absence of a battery, the type of battery, and the battery remaining capacity, controls the DC/DC converter on the basis of the detection result and an instruction from the system control circuit 50, and applies a required voltage to each unit including a recording medium for a required period of time.

Reference numerals 82 and 84 denote connectors; and 86, a power supply which is, for example, a primary battery such as an alkaline battery or lithium battery, a secondary battery such as an NiCd battery, NiMH battery, or Li battery, an AC adapter, or the like.

Reference numerals 90 and 94 denote interfaces for recording media such as a memory card and hard disk; 92 and 96, connectors for connection to recording media such as a memory card and hard disk; and 98, a recording medium attachment/detachment detection unit for detecting whether the recording medium 200 or 210 is attached to the connector 92 or 96. This embodiment includes two interface/connector systems to which recording media are attached. However, the present invention may have an arrangement having one or a plurality of interface/connector systems to which recording media are attached. In addition, the present invention may have an arrangement having a combination of interfaces and connectors conforming to different specifications.

The present invention may use an interface and connector conforming to the specifications of a PCMCIA card, CF (Compact Flash) card, or the like. If the interfaces 90 and 94 and connectors 92 and 96 are those that conform to the specifications of a PCMCIA card, CF (Compact Flash) card, or the like, this apparatus can exchange image data and management information attached to image data with peripheral devices such as a computer and printer by connecting various communication cards such as a LAN card, modem card, USB card, IEEE1394 card, P1284 card, SCSI card, and PHS communication card.

The protective means 102, which is a barrier, covers the image pickup unit including the lens 10 of the image processing apparatus 100 to protect the imaging unit against contamination and damage.

The optical finder 104 allows the user to photograph without using the electronic finder function implemented by the image display unit 28. In the optical finder 104, the function of the display unit 54 is partly set to provide, for example, an in-focus indication, camera shake warning indication, flash recharge indication, shutter speed indication, aperture value indication, exposure correction indication, and the like.

Reference numeral 110 denotes a communication means having various communication functions such as an RS232C, USB, IEEE1394, P1284, SCSI, modem, LAN, and radio communication functions; and 112, a connector for connecting the image processing apparatus 100 to another device through the communication means 110 or an antenna in radio communication Reference numeral 120 denotes an electronic zoom setting unit for turning on/off the electronic zoom function; and 122, a recording mode setting unit for performing compression ratio setting or non-compression setting for an image to be recorded. In this embodiment, the electronic zoom setting unit 120 and recording mode setting unit 122 respectively implement the electronic zoom setting means and recording mode setting means of the present invention. The electronic zoom setting unit 120 permits/inhibits the use of the electronic zoom function implemented by the electronic zoom setting unit 120.

The recording medium 200 is a memory card, hard disk, or the like, and includes a recording unit 202 formed by a semiconductor memory or magnetic disk, an interface 204 for the image processing apparatus 100, and a connector 206 for connection to the image processing apparatus 100. The recording medium 210 is a memory card, hard disk, or the like, and includes a recording unit 212 formed by a semiconductor memory or magnetic disk, an interface 214 for the image processing apparatus 100, and a connector 216 for connection to the image processing apparatus 100.

The operation of the image processing apparatus according to this embodiment will be described next with reference to FIGS. 2 to 6.

Figure 2:
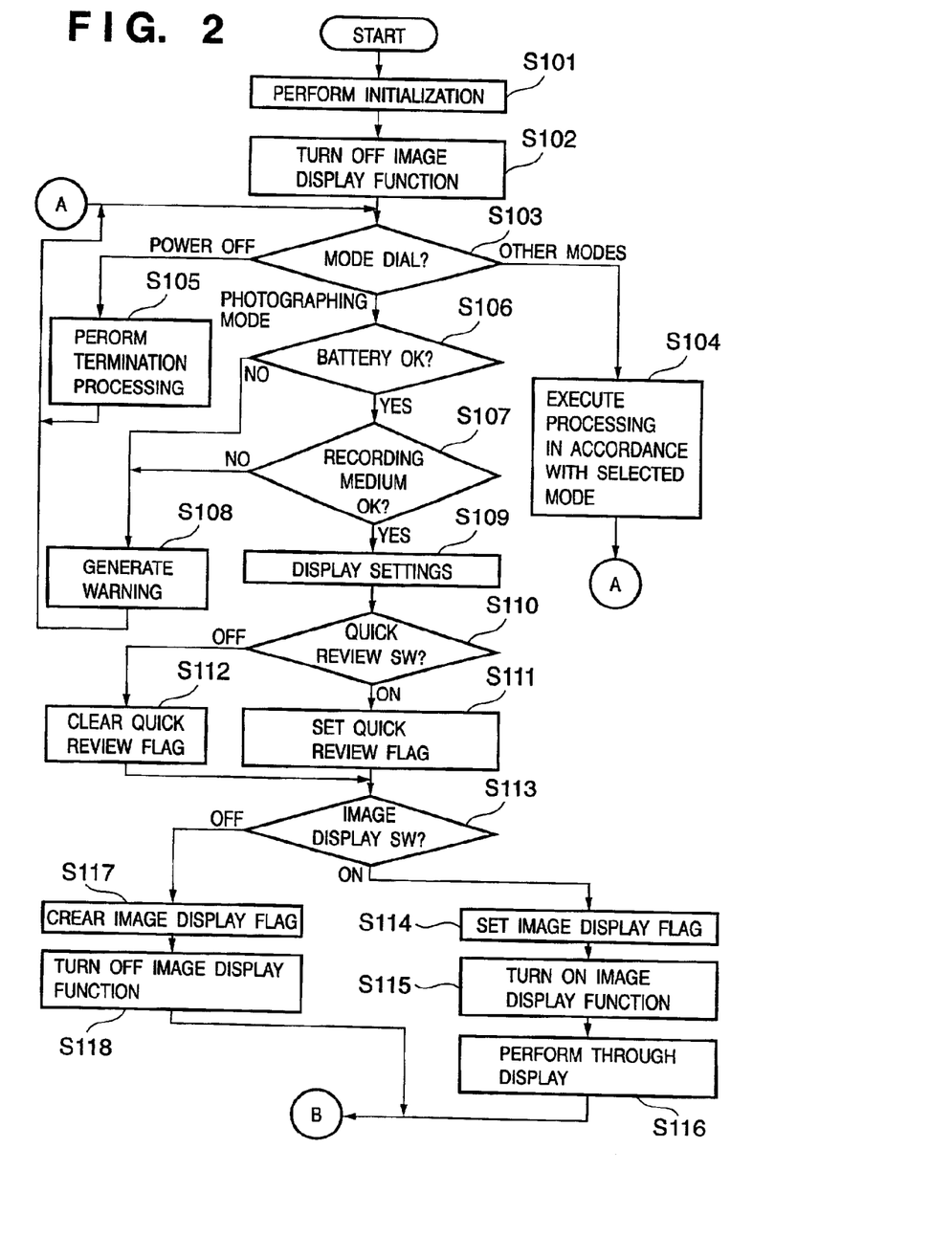
FIG. 2 is a flow chart showing part of the main routine of this embodiment.
Figure 3:
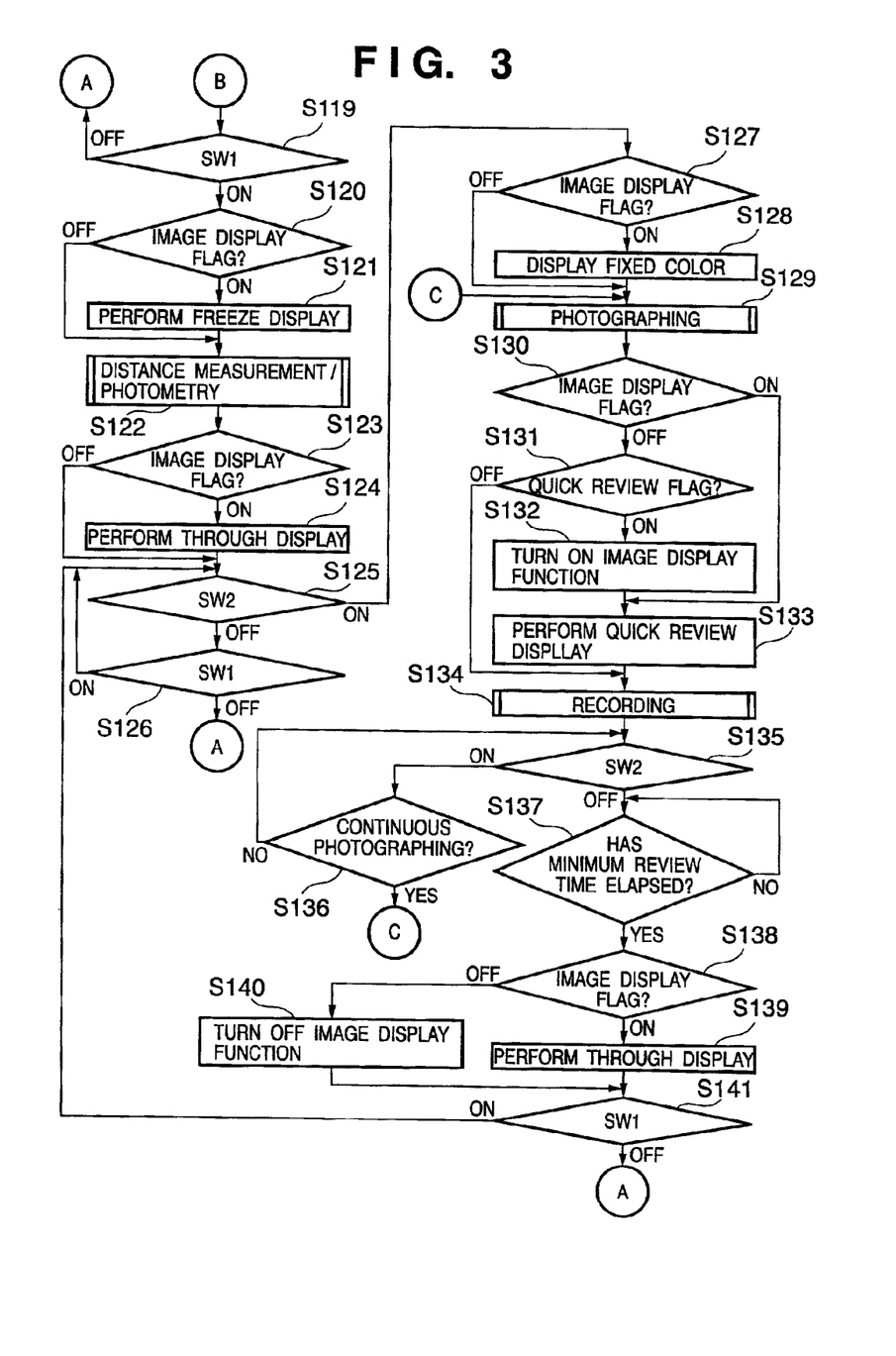
FIG. 3 is a flow chart showing part of the main routine of this embodiment.

FIGS. 2 and 3 are flow charts showing the main routine of the image processing apparatus 100 according to this embodiment. In the flow chart shown in FIG. 2, when power is turned on upon a battery change or the like, the system control circuit 50 initializes flags, control variables, and the like (step S101) and initializes the image display of the image display unit 28 to the OFF state (step S102).

The system control circuit 50 determines the set position of the mode dial switch 60. If the mode dial switch 60 is set to "power OFF" (step S103), the system control circuit 50 performs predetermined termination processing, e.g., changing the display of each display unit to the end state, closing the barrier of the protective means 102 to protect the imaging unit, recording necessary parameters including flags, control variables, and the like, the set value, and the set mode in the nonvolatile memory 56, and causing the power control circuit 80 to interrupt the supply of unnecessary power to the respective units of the image processing apparatus 100 including the image display unit 28 (step S105). The flow then returns to step S103.

If the mode dial switch 60 is set to the photographing mode (step S103), the flow advances to step S106.

If the mode dial switch 60 is set to another mode (step S103), processing corresponding to the selected mode is executed (step S104). When the processing is complete, the flow returns to step S103.

In step S106, the system control circuit 50 uses the power control circuit 80 to check whether the remaining capacity of the power supply 86 constituted by a battery and the like or its operation state poses a problem in the operation of the image processing apparatus 100. If a problem arises (step S106), predetermined warning display is performed by the display unit 54 using an image or sound (step S108). The flow then returns to step S103.

If no problem arises in the power supply 86 (step S106), the system control circuit 50 checks whether the operation state of the recording medium 200 or 210 poses any problem in the operation of the image processing apparatus 100, more specifically, recording/reproducing operation of image data with respect to the recording medium (step S107). If a problem arises, predetermined warning display is performed by the display unit 54 using an image or sound (step S108). Thereafter, the flow returns to step S103.

If no problem arises in the operation state of the recording medium 200 or 201 (step S107), the display unit 54 is used to display various set states of the image processing apparatus 100 using images and sounds (step S109). If the image display function of the image display unit 28 is ON, the image display unit 28 is also used to display various set states of the image processing apparatus 100 using images and sounds.

The system control circuit 50 checks the set state of the quick review ON/OFF switch 68 (step S110). If this switch is set to "quick review ON", a quick review flag is set (step S111). If the switch is set to "quick review OFF", the quick review flag has been cleared (step S112). Note that the state of the quick review flag is stored in the internal memory of the system control circuit 50 or the memory 52.

Subsequently, the system control circuit 50 checks the set state of the image display ON/OFF switch 66 (step S113). If this switch is set to "image display ON", an image display flag is set (step S114), and the image display function of the image display unit 28 is set in the ON state (step S115), and is also set to a through display state in which picked image data are sequentially displayed (step S116). The flow then advances to step S119 in FIG. 3. In the through display state, the data sequentially written in the image display memory 24 through the shutter 12, A/D converter 16, image processing circuit 20, and memory control circuit 22 are sequentially displayed on the image display unit 28 through the memory control circuit 22 and D/A converter 26, thereby implementing an electronic finder function.

If the image display ON/OFF switch 66 is set to "image display OFF" (step S113), the image display flag is cleared (step S117), and the image display function of the image display unit 28 is set to the OFF state (step S118). The flow then advances to step S119 in FIG. 3. In the case of "image display OFF", photographing is performed by using the optical finder 104 without using the electronic finder function of the image display unit 28. In this case, the power consumption of the image display unit 28, D/A converter 26, or the like which consumes a large amount of power can be reduced. Note that the state of the image display flag is stored in the internal memory of the system control circuit 50 or the memory 52.

The recording mode setting unit 122 allows the user to set a compression ratio for an image to be recorded or non-compression recording. The electronic zoom setting unit 120 sets the ON/OFF operation of the electronic zoom function. If the user wants to obtain a high-quality image, he/she sets a low compression ratio for the image to be recorded or non-compression recording. If the electronic zoom function is set in this case, the image deteriorates due to electronic zoom processing. In this embodiment, when a low compression or non-compression recording is set in the recording mode, the electronic zoom function is inhibited. This makes it possible to prevent an image that has deteriorated due to the electronic zoom function from being recorded when the user tries to photograph with high image quality. This electronic zoom setting will be described in detail below with reference to FIG. 7.

In the flow chart shown in FIG. 3, if the shutter switch SW1 is not pressed (step S119), the flow returns to step S103.

If the shutter switch SW1 is pressed (step S119), the system control circuit 50 checks the state of the image display flag stored in the internal memory of the system control circuit 50 or the memory 52 (step S120). If the image display flag is set, the system control circuit 50 sets the display state of the image display unit 28 to a freeze display state (step S121). The flow advances to step S122. In the freeze display state, the system control circuit 50 inhibits an image data rewrite in the image display memory 24 through the image pickup element 14, A/D converter 16, image processing circuit 20, and memory control circuit 22. The last image data written in the image display memory 24 is then displayed on the image display unit 28 through the memory control circuit 22 and D/A converter 26, thereby displaying the frozen picture on the electronic finder. If the image display flag has been cleared (step S120), the flow advances to step S122.

The system control circuit 50 performs distance measurement processing and focuses the phototaking lens 10 on the object. The system control circuit 50 then performs photometric processing to determine an aperture value and shutter time (step S122). In photometric processing, flash setting is also made, as needed. This distance measurement/photometric processing (step S122) will be described in detail later with reference to FIG. 4.

When distance measurement/photometric processing (step S122) is complete, the system control circuit 50 checks the state of the image display flag stored in the internal memory of the system control circuit 50 or the memory 52 (step S123). If the image display flag is set, the display state of the image display unit 28 is set to the through display state (step S124), and the flow advances to step S125. Note that the through display state in step S124 is analogous to the through state in step S116.

If the shutter switch SW2 is not pressed (step S125), and the switch SW1 is released (step S126), the flow returns to step S103.

If the switch SW2 is pressed (step S125), the system control circuit 50 checks the state of the image display flag stored in the internal memory of the system control circuit 50 or the memory 52 (step S127). If the image display flag is set, the display state of the image display unit 28 is set to the fixed color display state (step S128), and the flow advances to step S129. In the fixed color display state, image data of a fixed color is displayed on the image display unit 28 through the memory control circuit 22 and D/A converter 26, in place of the photographed image data written in the image display memory 24 through the image pickup element 14, A/D converter 16, image processing circuit 20, and memory control circuit 22, thereby displaying the picture of the fixed color on the electronic finder. If the image display flag has been cleared (step S127), the flow advances to step S129.

The system control circuit 50 executes photography processing constituted by exposure processing in which the photographed image data is written in the memory 30 through the image pickup element 14, A/D converter 16, image processing circuit 20, and memory control circuit 22 or directly from the A/D converter 16 through the memory control circuit 22, and developing processing in which the image data written in the memory 30 is read out and variously processed by using the memory control circuit 22, and the image processing circuit 20 as needed (step S129). This photography processing (step S129) will be described in detail later with reference to FIG. 5.

The system control circuit 50 checks the state of the image display flag stored in the internal memory of the system control circuit 50 or the memory 52 (step S130). If the image display flag is set, quick review display is performed (step S133). In this case, the image display unit 28 is always displayed as an electronic finder even during photographing operation, and quick review display is performed immediately after the photographing operation.

If the image display flag has been cleared (step S130), the state of the quick review flag stored in the internal memory of the system control circuit 50 or the memory 52 is checked (step S131). If the quick review flag is set, the image display state of the image display unit 28 is set to the ON state (step S132), and quick review display is performed (step S133).

As described above, according to this embodiment, no electronic finder function is required because power saving is required or photographing is performed by using the optical finder 104. Even if the image display state of the image display unit 28 is set to the OFF state, a photographed image can be automatically reproduced on the image display unit 28 immediately after photographing as long as the quick review function is set by the quick review switch, thereby providing a useful function for power saving and a check on a photographed image.

If the image display flag has been cleared (step S130) and the quick review flag has also been cleared (step S131), the flow advances to step S134 while the image display unit 28 is kept in the OFF state. In this case, the image display unit 28 is kept OFF even after photographing, and no quick review display is performed. In this operation method, there is no need to check a photographed image immediately after photographing as in a case where photographing is continued by using the optical finder 104, and the electronic finder function of the image display unit 28 is not used, thus placing importance to power saving.

The system control circuit 50 reads out photographed image data written in the memory 30, performs various image processes for the data by using the memory control circuit 22 and also using the image processing circuit 20 as needed, and compresses the image data in accordance with the set mode by using the compression/decompression circuit 32. Thereafter, the system control circuit 50 executes recording processing to write the image data in the recording medium 200 or 210 (step S134). This recording processing (step S134) will be described in detail later with reference to FIG. 6.

If the shutter switch SW2 is pressed (step S135) upon completion of the recording processing (step S134), the system control circuit 50 checks the state of the continuous photographing flag stored in the internal memory of the system control circuit 50 or the memory 52 (step S136). Assume that the continuous photographing flag is set. In continuous photographing, the flow returns to step S129 to perform next photographing operation. If the continuous photographing flag is not set (step S136), the current processing is repeated until the shutter switch SW2 is released (step S135).

As described above, according to this embodiment, if the shutter switch SW2 is kept pressed upon completion of the recording processing (step S134) in an operation set state in which quick review display is to be done immediately after photographing, the quick review display in the image display unit 28 is continued until the shutter switch SW2 is released. This allows the user to carefully check the photographed image.

Assume that the shutter switch SW2 is released when the recording processing (step S134) is completed, or the shutter switch SW2 is released (step S135) after the shutter switch SW2 is kept pressed to continue quick review display, and the photographed image is checked. In this case, the flow advances to step S138 after a lapse of a predetermined minimum review time (step S137).

As described above, according to this embodiment, by continuing quick review display in the image display unit 28 for a predetermined period of time, the user can reliably check a photographed image. In addition, this makes it possible to prevent quick review display from continuing for an unnecessarily long period of time, thus preventing the user from losing a next photographing chance. Note that this minimum review time may be a fixed value, or may be arbitrarily set by the user, or may be a value set or selected by the user within a predetermined range.

If the image display flag is set (step S138), the system control circuit 50 sets the display state of the image display unit 28 to the through display state (step S139), and the flow advances to step S141. In this case, the through display state can be set, in which after a photographed image is checked by quick review display on the image display unit 28, picked image data is sequentially displayed to perform next photographing operation.

If the image display flag has been cleared (step S138), the image display state of the image display unit 28 is set to the OFF state (step S140), and the flow advances to step S141. In this case, after the photographed image is checked by using the quick review display on the image display unit 28, the function of the image display unit 28 is stopped for power saving, thereby reducing the power consumption of the image display unit 28, D/A converter 26, and the like which consume large quantities of power.

If the shutter switch SW1 is pressed (step S141), the system control circuit 50 returns to step S125 to prepare for the next photographing operation. If the shutter switch SW1 is in a released state (step S141), the system control circuit 50 terminates a series of photographing operations, and returns to step S103.

Figure 4:
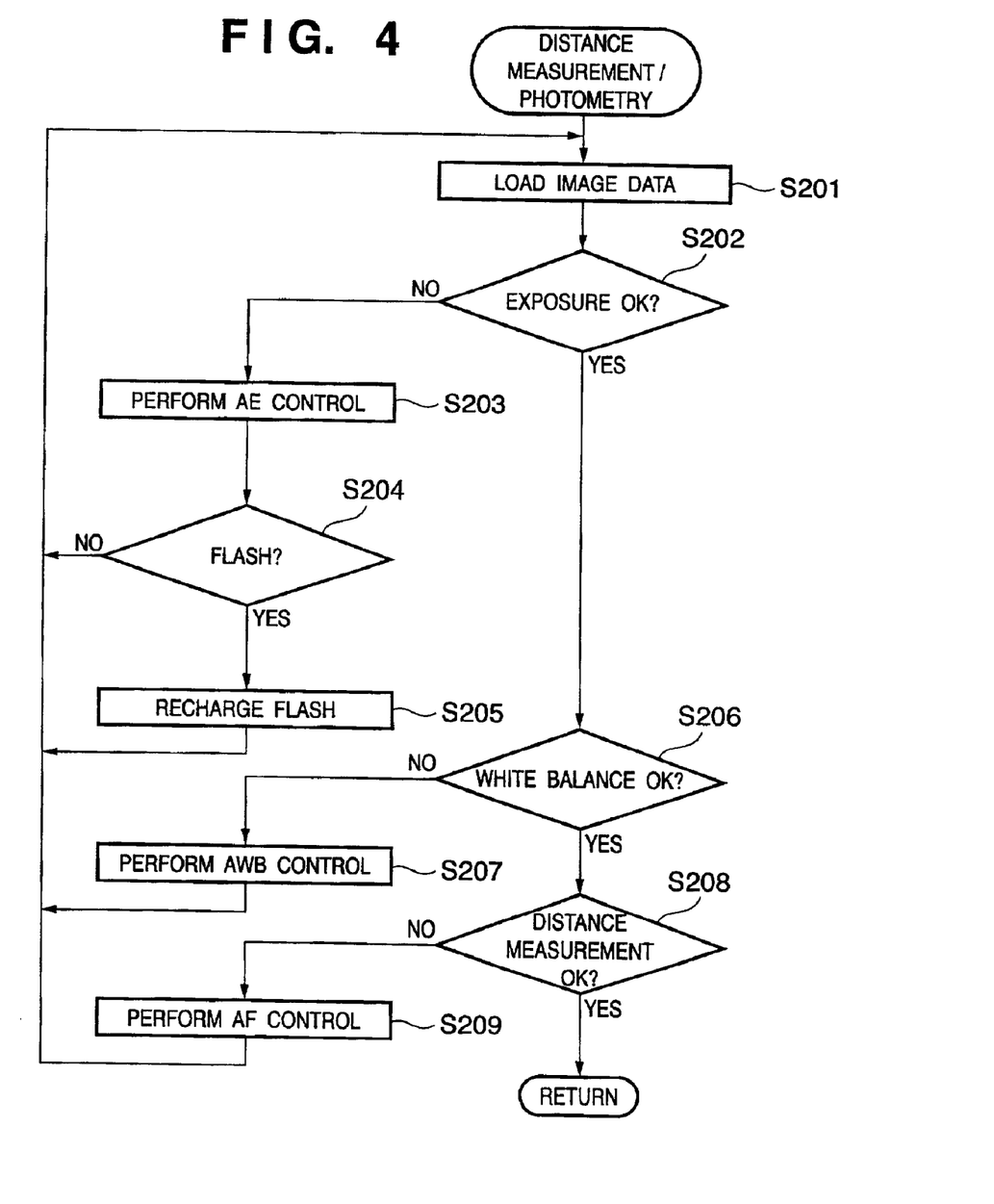
FIG. 4 is a flow chart showing a distance measurement/photometry routine.

FIG. 4 is a flow chart showing the details of the distance measurement/photometric processing in step S122 in FIG. 3. The system control circuit 50 reads out charge signals from the image pickup element 14, and sequentially loads the photographed image data into the image processing circuit 20 through the A/D converter 16 (step S201). The image processing circuit 20 performs predetermined computation used for TTL (Through The Lens) AE (Automatic Exposure) processing, EF (Electronic Flash pre-emission) processing, and AF (AutoFocus) processing by using the sequentially loaded image data. In each process in this case, a predetermined number of specific pixels are extracted from all photographed pixels and used for computation. This makes it possible to perform optimal computation in each of different modes, e.g., a centerweighted mode, average mode, and evaluation mode in each of TTL AE, EF, AWB, and AF.

The system control circuit 50 performs AE control by using the exposure control means 40 on the basis of the computation result obtained by the image processing circuit 20 (step S203) until it is determined that exposure (AE) is proper (step S202). The system control circuit 50 checks, by using the measurement data obtained by AE control, whether a flash is required (step S204). If a flash is required, the flash flag is set, and the flash 48 is recharged (step S205). If it is determined that exposure (AE) is proper (step S202), the measurement data or set parameters are stored in the internal memory of the system control circuit 50 or the memory 52.

The system control circuit 50 performs AWB control by adjusting parameters for color processing using the image processing circuit 20 on the basis of the computation result obtained by the image processing circuit 20 and the measurement data obtained by AE control (step S207) until it is determined that the white balance (AWB) is proper (step S206). If it is determined that the white balance (AWB) is proper (step S206), the measurement data or set parameters are stored in the internal memory of the system control circuit 50 or the memory 52.

The system control circuit 50 performs AF control by using the distance measurement control means 42 on the basis of the measurement data obtained by AE control and AWB control (step S209) until it is determined that an in-focus state is obtained in distance measurement (AF) (step S208). If it is determined that an in-focus state is obtained in distance measurement (AF) (step S208), the measurement data or set parameters are stored in the internal memory of the system control circuit 50 or the memory 52. The distance measurement/photometric processing routine is then terminated (step S122).

Figure 5:
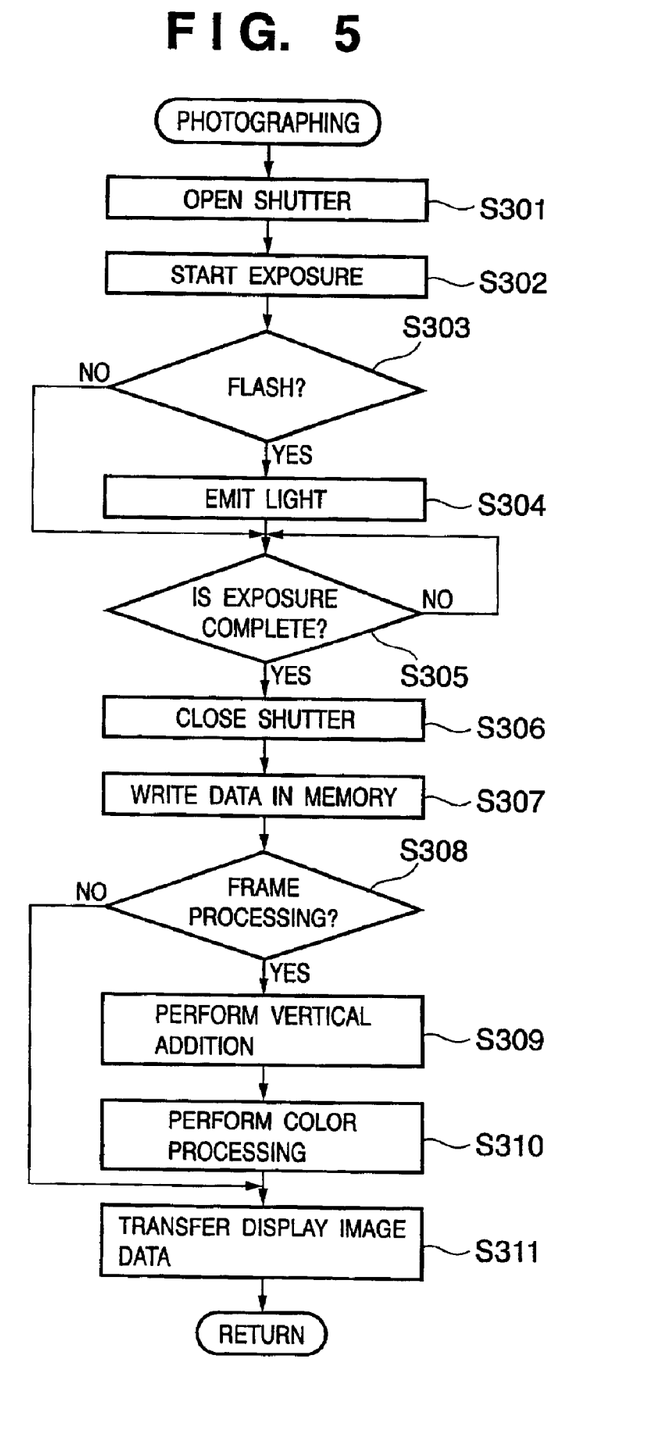
FIG. 5 is a flow chart showing a photographing routine.

FIG. 5 is a flow chart showing the details of photographing processing in step S129 described in FIG. 3. In accordance with the photometric data stored in the internal memory of the system control circuit 50 or the memory 52, the system control circuit 50 releases the shutter 12 having the stop function by using the exposure control means 40 in accordance with the aperture value, thereby exposing the image pickup element 14 (steps S301 and S302).

The system control circuit 50 determines on the basis of the flash flag whether the flash 48 is required (step S303). If it is determined that the flash is required, the system control circuit 50 makes the flash 48 emit light (step S304).

The system control circuit 50 waits until exposure of the image pickup element 14 is completed in accordance with the photometric data (step S305), and closes the shutter 12 (step S306). In addition, the system control circuit 50 reads charge signals from the image pickup element 14, and writes the photographed image data in the memory 30 through the A/D converter 16, image processing circuit 20, and memory control circuit 22 or directly through the memory control circuit 22 from the A/D converter 16 (step S307).

If frame processing is required in accordance with the set photographing mode (step S308), the system control circuit 50 reads out the image data written in the memory 30 and sequentially performs vertical addition processing (step S309) and color processing (step 310) by using the memory control circuit 22 and also using the image processing circuit 20 as needed, and writes the image data having undergone the processing in the memory 30.

The system control circuit 50 reads out image data from the memory 30, and transfers the display image data to the image display memory 24 through the memory control circuit 22 (step S311). After such a series of operations, the photographing processing routine (step S129) is terminated.

Figure 6:
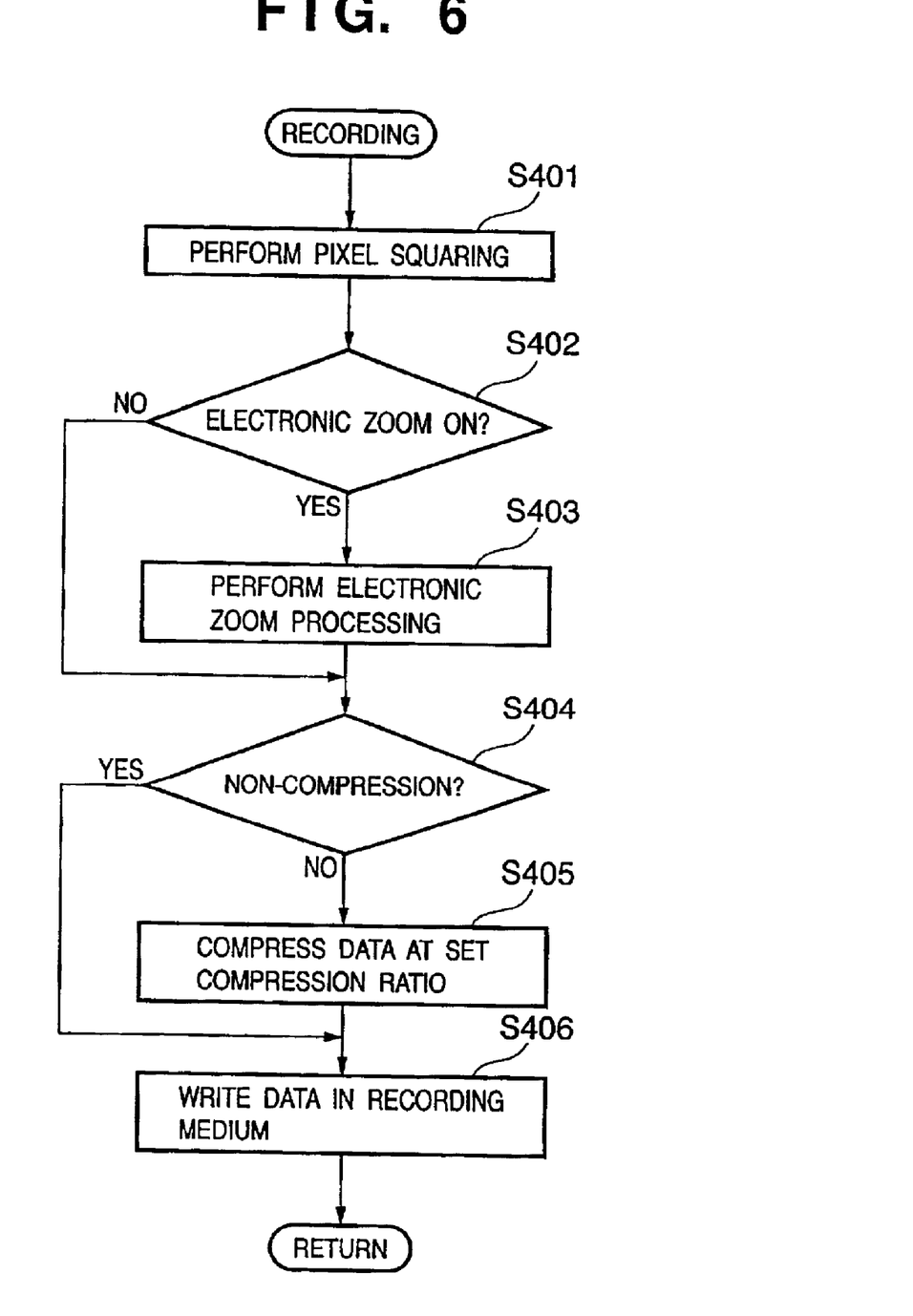
FIG. 6 is a flow chart showing a recording routine.

FIG. 6 is a flow chart showing the details of the recording processing in step S134 in FIG. 3. The system control circuit 50 reads out photographed image data written in the memory 30 and performs pixel squaring processing of setting the pixel aspect ratio of the image pick up element to 1:1 by using the memory control circuit 22 and also using the image processing circuit 20 as needed (step S401). The system control circuit 50 then writes the image data having undergone the processing in the memory 30.

The system control circuit 50 then reads out the image data written in the memory 30 and checks whether the electronic zoom setting has been made (step S402). If the electronic zoom function is set, zooming is performed at the magnification designated by the user (step S403), and it is checked whether the non-compression recording mode is set (step S404). If the non-compression recording is not set, the compression/decompression circuit 32 performs image compression processing at a compression ratio corresponding to the setting (step S405) Thereafter, the system control circuit 50 writes the compressed image data in the recording medium 200 or 210 such as a memory card or compact flash card through the interface 90 or 94 and the connector 92 or 96 (step S406). When the write in the recording medium is terminated, the recording processing routine (step S134) is terminated.

Figure 7:
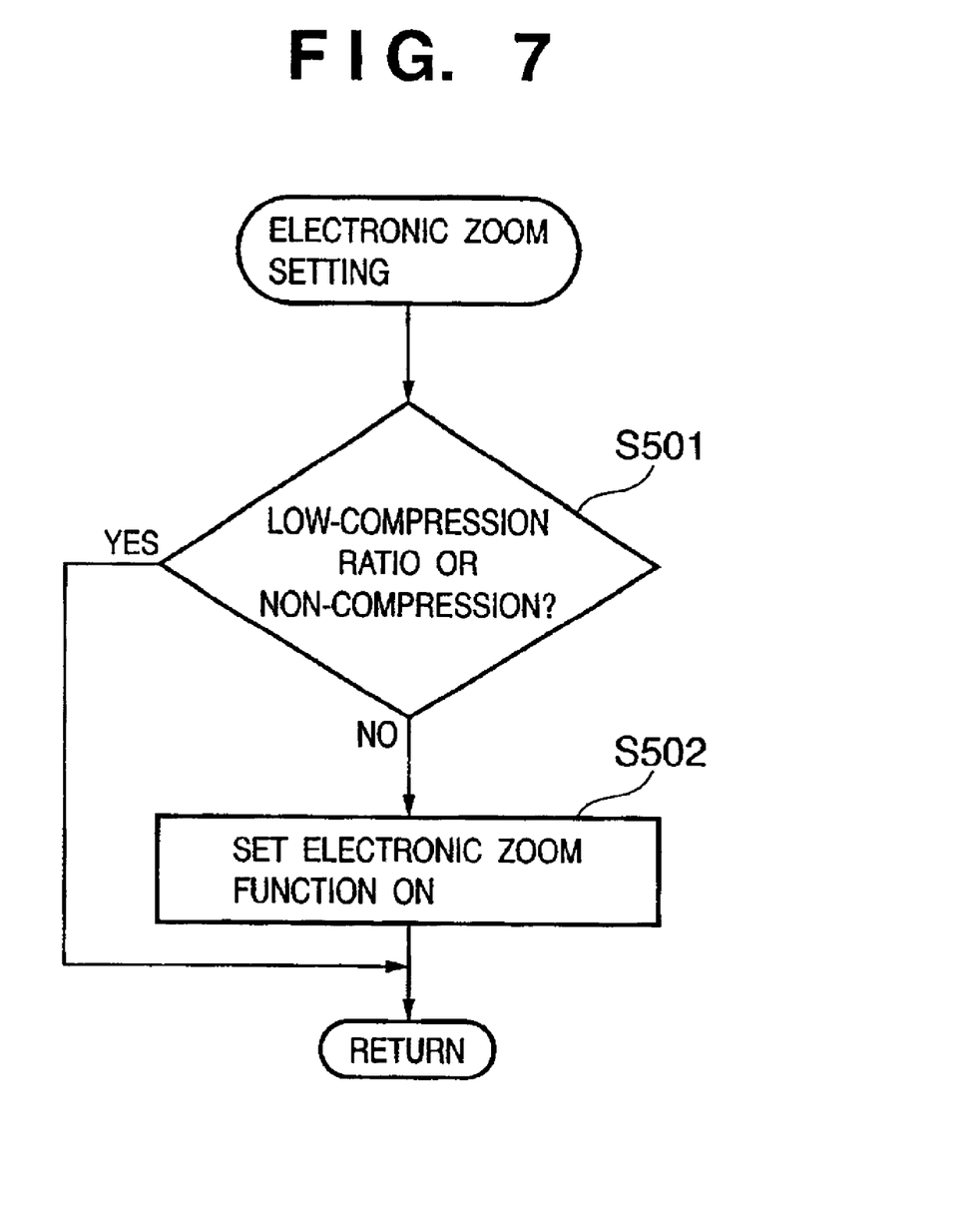
FIG. 7 is a flow chart showing an electronic zoom setting routine.

FIG. 7 is flow chart showing electric zoom setting in detail. In setting the electric zoom in the ON state through the electronic zoom setting unit 122 from the memory 30, and checks whether the recording mode is set to a compression ratio lower than a predetermined compression ratio or the non-compression mode (step S501). If the recording mode is not set a compression ratio lower than the predetermined compression ratio or the non-compression mode, the electronic zoom ON flag is set (step S502). If the recording mode is set to a compression ratio lower than a predetermined compression ratio or non-compressed mode, the electronic zoom flag is turned off to restric electronic zoom operation, and the electronic zoom setting routine is terminated.

In this embodiment, if the recording mode is set to the low-compression ratio mode or non-compression mode, electronic zoom setting is always inhibited. If, for example, the recording mode is set to the low-compression ratio mode or non-compression mode while the photographing mode is set to the full automatic mode, electronic zoom setting may be inhibited. If the photographing mode is set to the manual mode, electronic zoom setting may be permitted even if the recording mode is set to the low-compression ratio mode or non-compression mode. In addition, even if the recording mode is set to a compression ratio lower than the predetermined compression ratio or the non-compression mode, the electronic zoom function may be permitted up to a predetermined magnification.

Other Embodiment

The object of the present invention is realized even by supplying a storage medium storing software program codes for realizing the functions of the above-described embodiment to a system or apparatus, and causing the computer (or a CPU or an MPU) of the system or apparatus to read out and execute the program codes stored in the storage medium.

In this case, the program codes read out from the storage medium realize the functions of the above-described embodiment by themselves, and the storage medium storing the program codes constitutes the present invention. As a storage medium for supplying the program codes, a floppy disk, a hard disk, an optical disk, a magnetooptical disk, a CD-ROM, a magnetic tape, a nonvolatile memory card, a ROM, or the like can be used.

The functions of the above-described embodiment are realized not only when the readout program codes are executed by the computer but also when the OS (Operating System) running on the computer performs part or all of actual processing on the basis of the instructions of the program codes.

The functions of the above-described embodiment are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

The shape and structure of each portion of the above embodiment are merely examples in practicing the present invention, and the technical scope of the present invention should not be interpreted limitedly by them. That is, the present invention can be practiced in various forms without departing from its technical idea and main characteristic features.

As has been described above, according to the above embodiment, if the recording mode designed to prevent a deterioration in image quality is set to the low-compression ratio mode or non-compression mode, setting of the electronic zoom function that tends to cause a deterioration in image quality is restricted. This makes it possible to prevent recording of a degraded image upon setting of the electronic zoom function against use's intention of preventing a deterioration in image quality.

The present invention is not limited to the above embodiments and various changes and modifications can be made within the spirit and scope of the present invention. Therefore, to apprise the public of the scope of the present invention, the following claims are made.

What is claimed is:

1. An image pickup apparatus comprising:
    a processing device configured to electronically enlarge an image picked up by an image pickup device;
    a setting device configured to set compressing operation for the image for a recording mode; and
    a control device configured to determine whether the recording mode is set with a compressing ratio lower than a predetermined value, and to restrict operation of said processing device in accordance with compressing operation for the image by said setting device, if it is determined that the recording mode is set with the compressing ratio lower than the predetermined value.

2. The apparatus according to claim 1, wherein if the compressing operation for the image, which is set by said setting device, is non-compressing operation, operation of said processing device is restricted.

3. The apparatus according to claim 1, wherein if an image pickup mode of said image pickup device is a manual mode, operation of said processing device is permitted regardless of the compression operation for the image which is set by said setting device.

4. An image processing method of processing an image picked up by an image pickup device, comprising determining whether a recording mode is set with a compressing ratio lower than a predetermined value, and restricting a processing operation of electronically enlarging the image if it is determined in said determining that the recording mode is set with the compressing ratio lower than the predetermined value.

5. The method according to claim 4, wherein said recording mode includes recording with a non-compression operation.

6. The method according to claim 4, wherein if an image pickup made of said image pickup device is a manual mode, the processing operation of electronically enlarging the image picked up by said image pickup device is permitted regardless of a setting for image compression operation.

7. A storage medium storing code for an operation processing program for an image processing apparatus that processes an image picked up by an image pickup device, the code, when executed, causes a computer to carry out the steps of: determining whether a recording mode is set with a compressing ratio lower than a predetermined value, and restricting a processing operation of electronically enlarging the image if it is determined in said determing that the recording mode is set with the compressing ratio lower than the predetermined value.

8. The storage medium according to claim 7, wherein said recording mode includes recording with a non-compression operation.

9. The medium according to claim 7, wherein if an image pickup mode of said image pickup device is a manual mode, the program permits the processing operation of electronically enlarging the image picked up by said image pickup device regardless of a compressing operation setting for the image.

* * * * *